(12) United States Patent
Swanson et al.

(10) Patent No.: US 11,036,543 B1
(45) Date of Patent: Jun. 15, 2021

(54) INTEGRATED RELIABILITY, AVAILABILITY, AND SERVICEABILITY STATE MACHINE FOR CENTRAL PROCESSING UNITS

(71) Applicant: Amazon Technologies, Inc., Seattle, WA (US)

(72) Inventors: Robert Charles Swanson, Olympia, WA (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 16/441,616

(22) Filed: Jun. 14, 2019

(51) Int. Cl.
*G06F 9/48* (2006.01)
*G06F 9/455* (2018.01)
*G06F 11/07* (2006.01)
*G06F 13/10* (2006.01)
*G06F 9/4401* (2018.01)
*G06F 9/54* (2006.01)

(52) U.S. Cl.
CPC ............ *G06F 9/485* (2013.01); *G06F 9/4401* (2013.01); *G06F 9/45558* (2013.01); *G06F 11/073* (2013.01); *G06F 11/0793* (2013.01); *G06F 13/102* (2013.01); *G06F 9/542* (2013.01); *G06F 2213/0026* (2013.01)

(58) Field of Classification Search
CPC ........................................................ G06F 9/485
See application file for complete search history.

(56) References Cited

U.S. PATENT DOCUMENTS

| 2015/0186322 | A1* | 7/2015 | Yao | G06F 9/542 714/42 |
| 2020/0117625 | A1* | 4/2020 | Browne | G06F 13/24 |
| 2020/0151056 | A1* | 5/2020 | Chen | G06F 11/1068 |

\* cited by examiner

*Primary Examiner* — Sisley N Kim
(74) *Attorney, Agent, or Firm* — Weaver Austin Villeneuve & Sampson LLP

(57) ABSTRACT

Systems and methods for an integrated reliability, availability, and serviceability (RAS) state machine are provided. Handling of RAS events by the Basic Input Output System (BIOS) of an integrated circuit device can result in lost processing time on the processing cores of a multi-core processor resulting from numerous system management interrupts generated by the BIOS. To reduce lost processing time, a dedicated state machine can execute instructions to handle RAS events independently of the BIOS and minimize the number of system management interrupts.

19 Claims, 6 Drawing Sheets

INTEGRATED RELIABILITY, AVAILABILITY, AND SERVICEABILITY STATE MACHINE FOR CENTRAL PROCESSING UNITS

BACKGROUND

Reliability, Availability, and Serviceability (RAS) events for a computing system are typically handled by integrated Basic Input Output System (BIOS) System Management Mode (SMM) code. SMM is a special processor operating mode initiated by a System Management Interrupt (SMI). During an SMI, the BIOS has complete control of all resources and the ability to directly interact with system memory.

When the computing system experiences an SMI, the operating system (OS) is paused, and all of the processor cores are halted. The BIOS gains control of the computing system, performs some operations related to the cause of the SMI, and then returns control of computing system operation to the OS. The OS is not aware of when an SMI may occur. If an error occurs during an SMI, the machine check interrupt will notify the BIOS machine check abort (MCA) handler, and the OS may not be able to properly shutdown. In some cases, to limit the number of SMIs, the number of conditions that may cause an SMI can be reduced, or a fewer number of errors that would generate an SMI may be reported.

BRIEF DESCRIPTION OF THE DRAWINGS

Various embodiments in accordance with the present disclosure will be described with reference to the drawings, in which.

DETAILED DESCRIPTION

Figure 1:
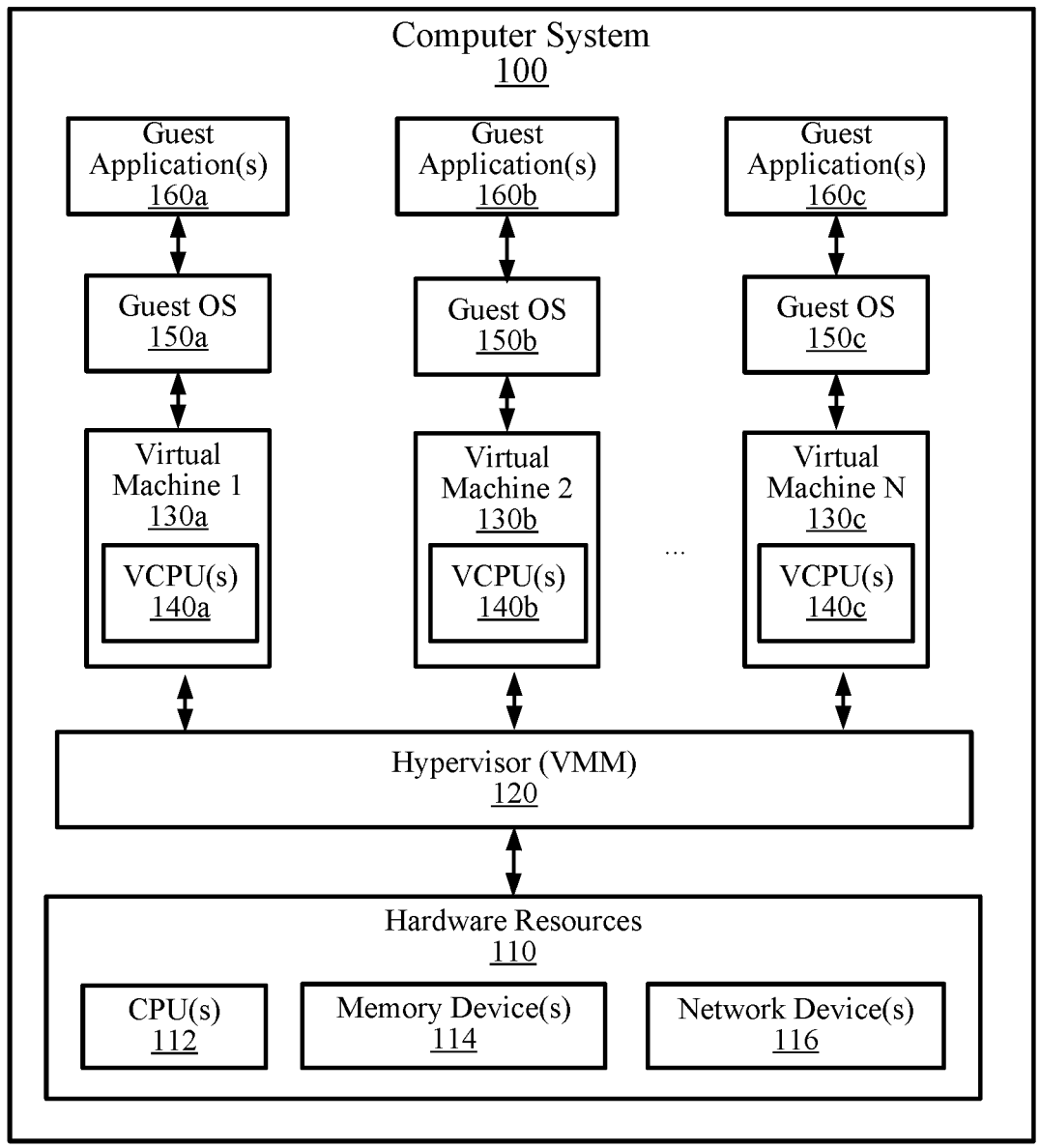
FIG. 1 is a simplified block diagram of an example of a virtualized computer system, according to certain aspects of the present disclosure.

Integrated circuit manufacturers rely upon integrated Basic Input Output System (BIOS) System Management Mode (SMM) code to handle Reliability, Availability, and Serviceability (RAS) events reported to the central processing unit (CPU) of a computing system. RAS refers to aspects of a computing system's design that affect the ability of the computing system to maintain continuous operation and to minimize the time necessary to service the system. SMM is a special mode of some processors that provides an execution operation that is transparent to the OS. The SMM code is intended for use only by system firmware, and not by applications software or general-purpose systems software. The SMM can only be entered through an SMI, and will be executed by the CPU in a separate address space made inaccessible to other operating modes of the CPU.

During platform initialization, the firmware (BIOS) of the computing system has complete control of the system and can perform any configuration operations that are required to prepare the system for an OS to take over. Once an OS is running, the OS expects that it has complete control of the computing system. SMM can be used to allow the firmware to retain some control over the system.

While in SMM, BIOS code is executed from a portion of the host or processor memory called System Management RAM (SMRAM), which can be hidden from the OS. The SMRAM can be implemented, for example, using dynamic random access memory (DRAM)). The BIOS code is executed in a different contextual operating environment that provides complete control over all aspects of the computing system (e.g., a server). SMM is intended to be completely transparent to the OS. When the system enters SMM, the firmware preserves the state of the central processing unit (CPU) in the SMRAM.

SMM is triggered through an SMI signal to the CPU. During platform initialization, the firmware configures SMIs for various events that the firmware is to be made aware of. These events may include, for example, but not limited to, thermal issues, memory errors, etc. The firmware can also designate the region of RAM that should be used as the SMRAM and specify a memory address where the CPU can jump to when an SMI occurs. During computing system operation, when a configured SMI triggering event is detected, an SMI signal notifies the CPU to enter SMM, and CPU execution jumps to the SMM entry point. The OS can be unaware of when an SMI occurs, and may lack the proper exception handling to deal with the SMI.

During SMM, the firmware checks for errors and performs low-level management operations, for example, but not limited to, changing cooling fan speeds, checking thermal zone temperatures, adjusting the CPU clock speed, remapping faulty memory regions, etc. Before leaving SMM, the firmware restores the state of the CPU from the SMRAM. From the perspective of the OS, those low-level management operations are happening automatically in the background. Simply put, when the system experiences an SMI, the OS is paused, the BIOS gains control to resolve the SMI, and then returns operational control to the OS.

In some implementations, an SMI generated by one core of a multicore processor will halt, or quiesce, all processor cores on the integrated circuit (e.g., a CPU) during SMM error checking. In a multicore processor system, each processing core can be assigned to a different virtual machine and may be used by a different user. Thus, all customer processes executing on all of the cores will be interrupted during an SMI.

When an SMI occurs, each core in the multicore processor will finish its current operation before the SMI can be serviced. In some cases, one or more cores may cause delays in servicing the SMI while finishing their respective operations. In some cases, one or more cores may be stalled. In the case of a stalled processing core, a timeout mechanism may allow the SMI to proceed if the processor operations are not finished by a certain timeout period. Once in SMM, the CPU may perform error checking by examining a linked list of error handlers to determine the cause of the SMI. A linked list is a linear data structure where each element is a separate object, for example, an event (e.g., a temperature related event, a memory error, etc.) that the firmware should be made aware of. The events in the linked list are read in order from the beginning, as linked lists are sequentially accessed, and the CPU may take significant time (e.g., hundreds of milliseconds) to read and service the events.

If an error occurs while in SMM, the machine check interrupt will notify the BIOS Machine Check Abort (MCA) handler. An MCA handler is a software sequence that accesses an error log register and instructs the operating system to terminate a process associated with the erroneous data address stored in the error log register. Since the interrupt may not be provided to the OS, the OS may interpret the MCA as an unexpected reset to the OS.

RAS features may rely upon the BIOS SMM infrastructure to heal the platform. For example, the BIOS SMM may be used at runtime to initiate repair of a broken or degraded portion (e.g., a memory) of an integrated circuit using a repair procedure. Some processors may use an Adaptive Double Device Data Correction (ADDDC) procedure. ADDDC is a mechanism by which failed memory sections can be repaired or a work-around be established (e.g., by remapping the failed memory sections to a functional memory). Using ADDDC, the BIOS can set up the integrated circuit to perform periodic SMIs to correct the degraded integrated circuit. When the repair procedure is completed, the BIOS can stop the periodic SMIs and allow the system to continue operating. However, because the system has been in a degraded state, error thresholds may be shortened and more SMIs may occur to ensure that the system continues to function correctly. In some cases, an SMI may be generated for every correctable error, causing all of the processing cores to quiesce each time an SMI is generated.

Various aspects of the present disclosure provide systems and methods for reducing the impact of SMI triggering events on system operation. According to certain aspects of the present disclosure, a dedicated RAS state machine (RAS_SM) implemented in hardware can be used to handle errors and remove the dependence on the BIOS to heal the integrated circuit. The system architecture may include a RAS_SM with system level communication capabilities (e.g., via PCIe) to communicate with the management infrastructure and/or the host OS. The management infrastructure may be a baseboard management controller (BMC).

The BMC (not shown) is a specialized service processor that monitors the physical state of a computer, network server, or other hardware device using sensors, and may communicate with the system administrator through an independent connection. The BMC may be used to perform tasks that a system administrator would otherwise need to physically visit the racked server to accomplish, for example, but not limited to, power cycling a server, monitoring fan speeds/component temperatures and/or other hardware failures, etc.

During operation, when the RAS_SM is enabled, the OS kernel may have full visibility into the execution of the RAS_SM such that a hypervisor may inspect operation of the RAS_SM and have the ability to initiate a given transaction. In some implementations, for example, where a bare metal server (i.e., a physical server dedicated to a single tenant) is provided, the RAS_SM may be hidden from the host OS. The RAS_SM may include an independent processing agent to execute the RAS code stored in a dedicated RAS ROM. The processing agent may independently determine an appropriate execution path through the RAS code based on the nature of the interrupt to be handled.

The RAS_SM may allow complicated error flows to be omitted from system software (e.g., BIOS), and may reduce the cost of enabling OS kernel changes. The RAS_SM may manage internal components of the system, and may have full access to the internal architecture, for example, the integrated memory controller (iMC), caching home agent (CHA), and other functional blocks for performing various RAS actions. The RAS_SM may follow Security Attributes Initiator (SAI) policies such that it is not able to access non-permitted entities. In some implementations, the RAS_SM architecture can be independent of the BIOS, and need not depend on the BIOS or the OS kernel for proper operation.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 is a simplified block diagram of an example of a virtualized computer system 100, according to certain aspects of this disclosure. Computer system 100 may include hardware resources 110 that may include one or more CPUs 112, one or more memory devices 114, one or more network devices 116, and/or other suitable components. A hypervisor 120 may execute on hardware resources 110 (e.g., through a host operating system) to manage a plurality of virtual machines on computer system 100, such as VM 1 (130a), VM 2 (130b), . . . , and VM N (130c), where N is at least one and may be up to, for example, 10, 20, or 100 or more.

Hypervisor 120, also referred to as a virtual machine manager (VMM), can emulate multiple virtual devices on a single physical device in a virtualized environment. Hypervisor 120 can also manage the flow of information between software, the virtualized hardware, and the physical hardware. Hypervisor 120 may be configured to create, start, monitor, stop, or delete each of VMs 1-N (130a-130c), and may execute at a higher privilege level than VMs 1-N (130a-130c). In some implementations, hypervisor 120 can manage access controls, resources, scheduling, isolation, etc., for VMs 1-N (130a-130c) that execute their respective guest operating systems. Hypervisor 120 may be implemented as a software layer or as code embedded in a firmware on computer system 100. Hypervisor 120 may be a type-2 hypervisor (e.g., hosted hypervisor) or a type-1 hypervisor (e.g., bare-metal hypervisor), or any other suitable implementation.

Each of VMs 1-N (130a-130c) may be a suitable emulation of a computer system that may be managed by hypervisor 120. Each of VMs 1-N (130a-130c) can run one or more independent operating systems and one or more applications or processes on hardware resources 110. Two or more VMs from VMs 1-N (130a-130c) may execute simultaneously or in any order on computer system 100. For example, in some instances, at a given time, VMs 1-N (130a-130c) may execute simultaneously on computer system 100. In some instances, VMs 1-N (130a-130c) may execute on computer system 100 one at a time. For example, hypervisor 120 may create and start VM 1 (130a) for a first user. After the user finishes running applications or processes on VM 1 (130a), hypervisor 120 may stop and delete VM 1 (130a), and create and start VM 2 (130b) for a second user, and so on.

Each of VMs 1-N (130a-130c) may be assigned to one or more virtual CPUs (VCPUs) 140a, 140b, or 140c. VCPUs are mapped to allocated time slices of available logical processors in the physical computer and can be scheduled by the hypervisor to allow more virtual processors than available physical processors. One or more guest operating systems 150a-150N may run on the one or more VCPUs 140a-140c in VM 1 (130a-VM N (130c), respectively. One or more guest applications 160a-160c may in turn run on and be managed by the corresponding guest operating systems.

The RAS_SM may be implemented as logic on a CPU, and may act like a PCIe device. The RAS_SM may be visible to the hypervisor, and may communicate with the hypervisor such that the hypervisor is aware when the RAS_SM is being executed. The hypervisor can also be made aware of the condition that triggered execution of the RAS_SM, and the current execution state of the RAS_SM at any point. By using the RAS_SM, only the affected cores, rather than all of the cores, may be halted.

Figure 2:
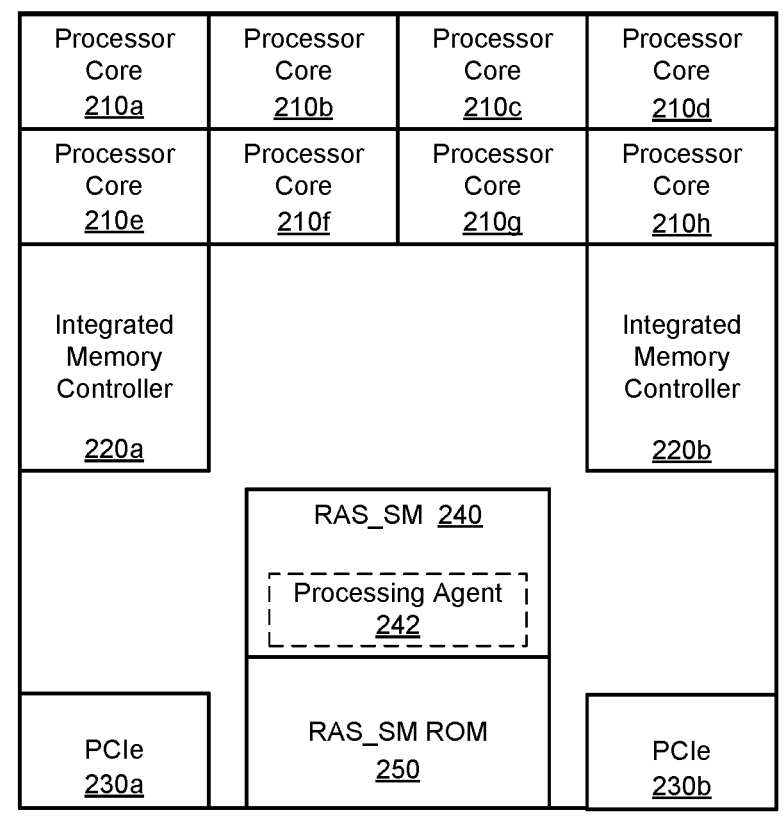
FIG. 2 is a block diagram of an example of a CPU including a Reliability, Availability, and Serviceability state machine (RAS_SM) according to aspects of the present disclosure.

FIG. 2 is a block diagram of an example CPU 112 including a RAS_SM according to aspects of the present disclosure. As referred to herein, the CPU may be a single die integrated circuit or a multi-die package. Referring to FIG. 2, the CPU 112 may include several processor cores 210a-210h, one or more integrated memory controllers 220a, 220b, one or more PCIe subsystems 230a, 230b, a RAS_SM 240, and RAS_SM read only memory (ROM) 250. Each of the processor cores 210a-210h may provide independent processing capabilities (e.g., each core executing one or more threads of different applications). In some cases, several processor cores may be grouped to execute multiple threads for one application. The integrated memory controllers 220a, 220b may manage the flow of data between the CPU and the host or processor memory.

The RAS_SM 240 may be a logic engine implemented in the hardware of the CPU. The RAS_SM 240 may have a dedicated (ROM) 250. The ROM 250 can be a memory component that is separate and distinct from the memory storing the general system firmware and/or BIOS of the system. The ROM 250 may be programmed by the manufacturer (e.g., mask ROM). The RAS_SM 240 may execute the RAS firmware code burned into the ROM 250 at manufacturing time. The RAS firmware code can be accessible (e.g., visible to the OS/hypervisor) for inspection and validation. While the RAS_SM ROM 250 may be programmed by the manufacturer, the RAS firmware may be patched, for example, by a firmware update delivered during BIOS POST or via the BMC. The RAS_SM 240 may also have on-package dedicated RAM (not shown) that is separate and independent from the host DRAM.

The RAS_SM 240 may be communicatively coupled to the PCIe subsystems 230a, 230b such that the RAS_SM 240 is visible as a PCIe device. A kernel level driver may be loaded by the OS to enable the OS to control the RAS_SM 240 and make the RAS_SM 240 visible to the hypervisor.

According to certain aspects of the disclosure, an interrupt (e.g., an SMI) may be serviced by the RAS_SM 240 acting as a PCIe device. A processing agent 242 of the RAS_SM 240 may independently determine an appropriate execution path through the RAS code based on the nature of the interrupt to be handled. For example, the interrupt may be caused by a memory error. The RAS_SM 240 may service the memory error to the hypervisor. The hypervisor may then move the affected workload off the DRAM (e.g., memory devices 114) and/or quiesce the processor core(s) (e.g., processor cores 210a-210h) associated with the affected workload. The RAS_SM 240 may then initiate a repair operation associated with the DRAM. When the repair operation is completed, the RAS_SM 240 may trigger an interrupt through the PCIe subsystem back to the hypervisor to indicate that the repair is done. The hypervisor may then move the affected workload back to the repaired DRAM locations, then the system may resume operation. If continuous errors are detected, the interrupts can be coalesced through the RAS_SM PCI device to the hypervisor. That may enable use of just one maintenance thread or a single interrupt to the hypervisor to handle the multiple errors. Since only the affected portions of the system will be quiesced, the interrupt will not impact all the tenants on the system, and aggregate performance loss will not be experienced.

Figure 3:
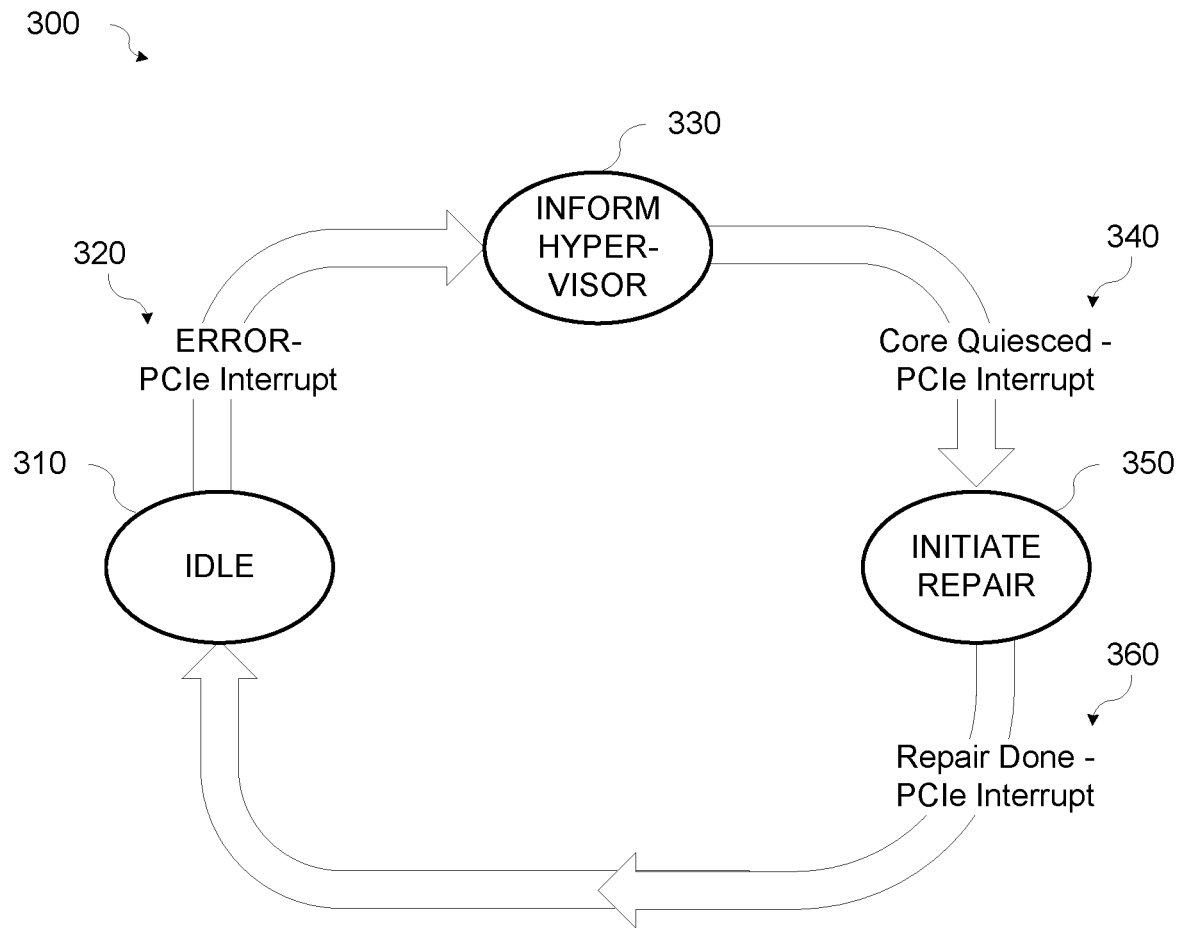
FIG. 3 is a state diagram illustrating the operation of an example of a RAS_SM according to aspects of the present disclosure.

FIG. 3 is a state diagram illustrating the operation of an example of a RAS_SM according to aspects of the present disclosure. The RAS_SM may be implemented as logic on the CPU, for example, a logic engine that executes the microcode of the RAS firmware. In some implementations, the RAS_SM may appear as a PCIe device to the rest of the system. In some cases, an interrupt may be caused by a memory error. During initialization of the integrated circuit device, the OS can discover RAS_SM capabilities (e.g., via a PCIe capabilities register or other capabilities register) such as whether the RAS_SM supports post package repair (PPR) of memory that can be invoked without requiring BIOS intervention. While operational, the OS can gather log information about all rows of memory that exhibit errors. If the number of times the same memory row exhibits errors exceeding a threshold, the RAS_SM flow may be initiated to enact PPR. The RAS_SM may ensure the memory repair is being handled appropriately. When the repair is complete, the RAS_SM may assert an interrupt.

The processing agent 242 of the RAS_SM 240 may independently determine the appropriate execution path through the RAS code to handle the memory error. Referring to FIG. 3, the RAS_SM (e.g., the RAS_SM 240) may be in an idle state 310 when the interrupt 320 is received. For example, the RAS_SM may receive the interrupt as a PCIe device through the PCIe subsystem (e.g., the PCIe subsystem 230a, 230b).

Upon receiving the interrupt 320, the RAS_SM may transition to a first interrupt state 330, and may inform the hypervisor of the interrupt. In response, the hypervisor may move the affected workload off the DRAM (e.g., memory devices 114) and/or quiesce the processor core(s) (e.g., processor cores 210a-210h) associated with the affected workload. The affected workload may involve one processor core or several processor cores. The hypervisor may trigger an interrupt 340 to the RAS_SM through the PCIe subsystem when the affected workload has been moved and the cores quiesced.

Upon receiving the interrupt 340, the RAS_SM may transition to a second interrupt state 350 and initiate one or more repair operations. For example, RAS_SM may initiate a repair operation associated with the affected DRAM. Once the RAS_SM begins execution, the type of error may dictate the quiesce/action needed. For example, for a memory repair event, only affected processor cores, rather than the entire system, may be quiesced. In other cases, for a critical issue that requires more quiescing or more blocking, the RAS_SM may follow a different path. Thus, the RAS_SM may compartmentalizes the actions associated with independent RAS events.

Rather than having the BIOS initiate the repair operation as a result of an SMI and quiescing all the processor cores of the CPU, the RAS_SM may quiesce only the affected processor core and initiate the repair operation. The RAS_SM may operate autonomously, for example as preconfigured by the OS or by the BIOS. Alternatively, the RAS_SM may notify the OS to initiate the repair operation. The RAS_SM may send a notification to the BMC subsystem indicating that a repair operation has been initiated. For example, the RAS_SM may assert an external error pin on the socket. The external error pin may be routed to the BMC, and the BMC may communicate the error to the CPU.

In addition to or alternative to initiating the memory repair procedure, the firmware may implement other repair procedures (e.g., RAS events) that may be offloaded from the BIOS to be performed on the CPU itself. However, in some cases, for other conditions such as live updates to assets in the field, business reasons unrelated to RAS, critical errors or viral messaging schemes that need to be contained, catastrophic security-related fix, etc., an SMI may be appropriate to lock the system down as fast as possible.

An interrupt 360 may be triggered by the RAS_SM through the PCIe subsystem when the repair operation is completed. Upon triggering the interrupt 360, the RAS_SM may transition back to the idle state 310. The interrupt 360 may inform the hypervisor that the repair operation is complete. In response, the hypervisor may move the affected workload back to the repaired DRAM (e.g., memory devices 114) and cause the processor core(s) (e.g., processor cores 210a-210h) associated with the affected workload to resume executing instructions. The affected workload may involve one processor core or several processor cores.

In some implementations, the BIOS may initiate RAS_SM operation. For example, the BIOS may receive a first SMI resulting from a memory error or other SMI triggering condition. The BIOS may enter SMM, and cause any in-process input/output transactions to be completed. The BIOS may then initiate RAS_SM operation, and generate a second SMI to exit SMM to allow the RAS_SM to service the event that caused the first SMI. Upon completion of the repair operation by the RAS_SM, an interrupt may be sent to the OS via the PCIe subsystem.

Figure 4:
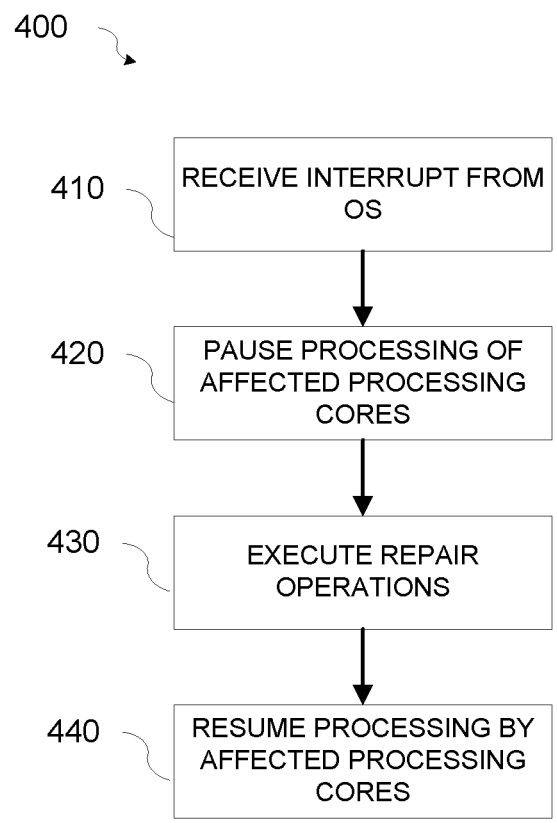
FIG. 4. is a flowchart illustrating an example of a method for handling an interrupt according to aspects of the present disclosure.

FIG. 4. is a flowchart illustrating an example of a method 400 for handling an interrupt according to aspects of the present disclosure. These methods may be implemented by the systems described above, such as for example in FIGS. 1-3.

Referring to FIG. 4, at block 410, the RAS_SM (e.g., the RAS_SM 240) may receive an interrupt indicating an error or other condition that may require servicing. For example, the RAS_SM may be in an idle state and may receive the interrupt as a PCIe device through the PCIe subsystem. In some implementations, the interrupt can be received from the OS or other system component. At block 420, operations being performed by the processing cores affected by the interrupt may be paused. The RAS_SM may execute instructions (e.g., stored in the RAS ROM) to cause the OS or hypervisor to quiesce processing in any processing cores affected by the interrupt. For example, if the interrupt involves a memory error, the RAS_SM may inform the hypervisor of the interrupt. In response, the hypervisor may move the affected workload off the DRAM (e.g., memory devices 114) and/or quiesce the processor core(s) (e.g., processor cores 210a-210h) associated with the affected workload.

At block 430, the RAS_SM may initiate one or more repair operations. For example, in the case of a memory error, RAS_SM may initiate a repair operation associated with the affected DRAM. Once the RAS_SM begins execution, the type of error may dictate the quiesce/action needed. For example, for a memory repair event, only the affected memory, rather than the entire system, may be quiesced. In other cases, for a critical issue that requires more quiescing or more blocking, the RAS_SM may follow a different path.

At block 440, processing by the affected processing cores may resume after the RAS_SM serviced the error condition. An interrupt may be triggered by the RAS_SM through the PCIe subsystem when the repair operation is completed. The interrupt may inform the hypervisor that the repair operation is complete. In the case of the memory error, for example, the hypervisor may move the affected workload back to the repaired DRAM and cause the processor core(s) associated with the affected workload to resume executing instructions. The affected workload may involve one processor core or several processor cores.

It should be appreciated that the specific steps illustrated in FIG. 4 provides a particular method for handling an interrupt according to various implementations. Other sequences of steps may also be performed according to alternative implementations. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
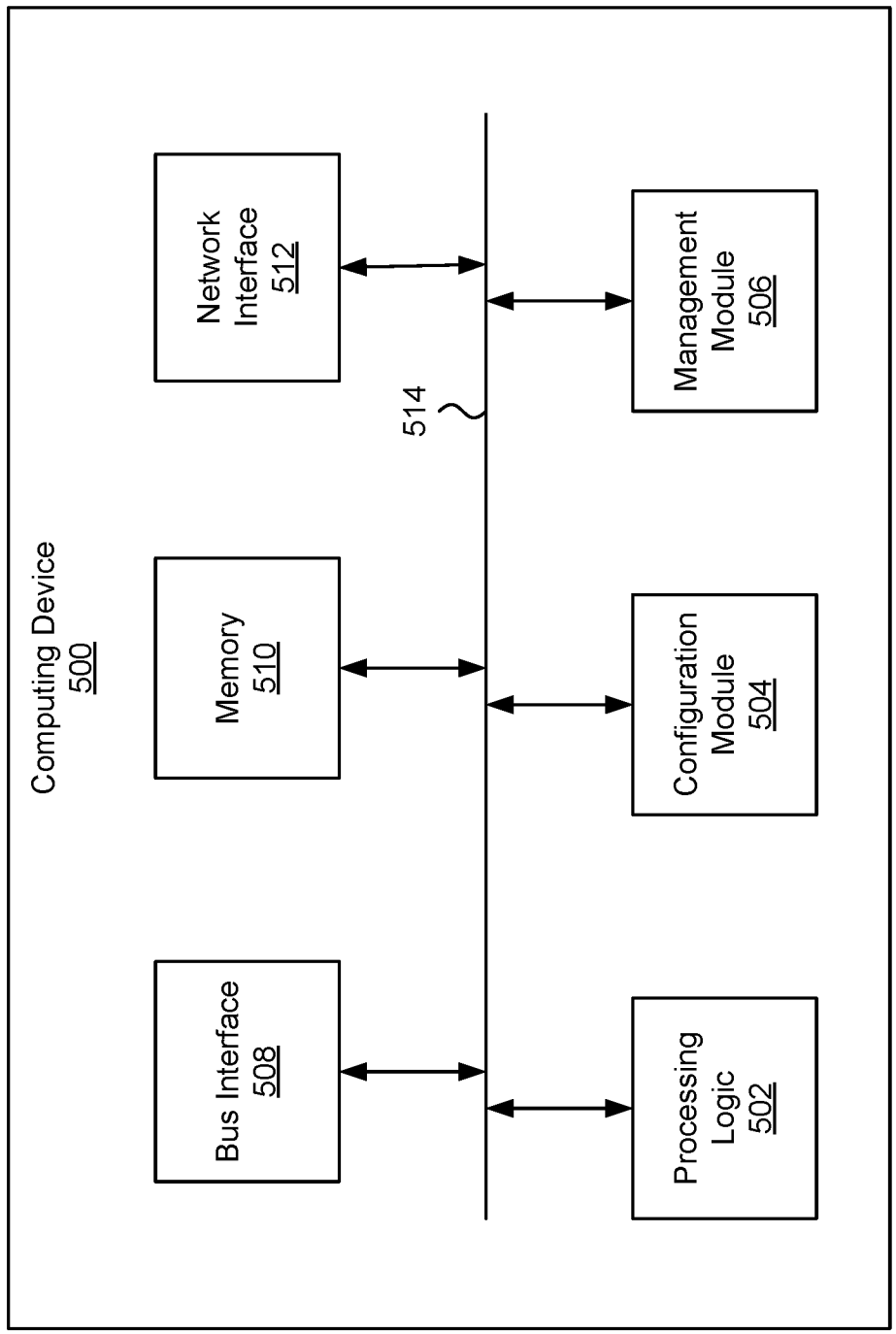
FIG. 5 illustrates an example of a computing device, according to certain aspects of the disclosure.

FIG. 5 illustrates an example of a computing device 500. Functionality and/or several components of the computing device 500 may be used without limitation with other embodiments disclosed elsewhere in this disclosure, without limitations.

In one example, the computing device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The computing device 500 may include additional modules, not illustrated here, such as components discussed with respect to the nodes disclosed in FIG. 6. In some implementations, the computing device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. The processing logic 502 may further include a state machine, for example the RAS_SM 240 and associated memory (RAS_SM ROM 250). The state machine can be configured to execute repair operations, for example, repair operations associated with RAS events. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the computing device 500, while in other cases some or all of the memory may be external to the computing device 500. The memory 510 may store an operating system comprising executable instructions that, when executed by the processing logic 502, provides the execution environment for executing instructions providing networking functionality for the computing device 500. The memory may also store and maintain several data structures and routing tables for facilitating the functionality of the computing device 500.

In some implementations, the configuration module 504 may include one or more configuration registers. Configuration registers may control the operations of the computing device 500. In some implementations, one or more bits in the configuration register can represent certain capabilities of the computing device 500. Configuration registers may be programmed by instructions executing in the processing logic 502, and/or by an external entity, such as a host device, an operating system executing on a host device, and/or a remote device. The configuration module 504 may further include hardware and/or software that control the operations of the computing device 500.

In some implementations, the management module 506 may be configured to manage different components of the computing device 500. In some cases, the management module 506 may configure one or more bits in one or more configuration registers at power up, to enable or disable certain capabilities of the computing device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the computing device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 500 may include multiple network interface modules, each configured to communicate with a different network. For example, in these implementations, the computing device 500 may include a network interface module for communicating with a wired Ethernet network, a wireless 802.11 network, a cellular network, an Infiniband network, etc.

The various components and modules of the computing device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 6:
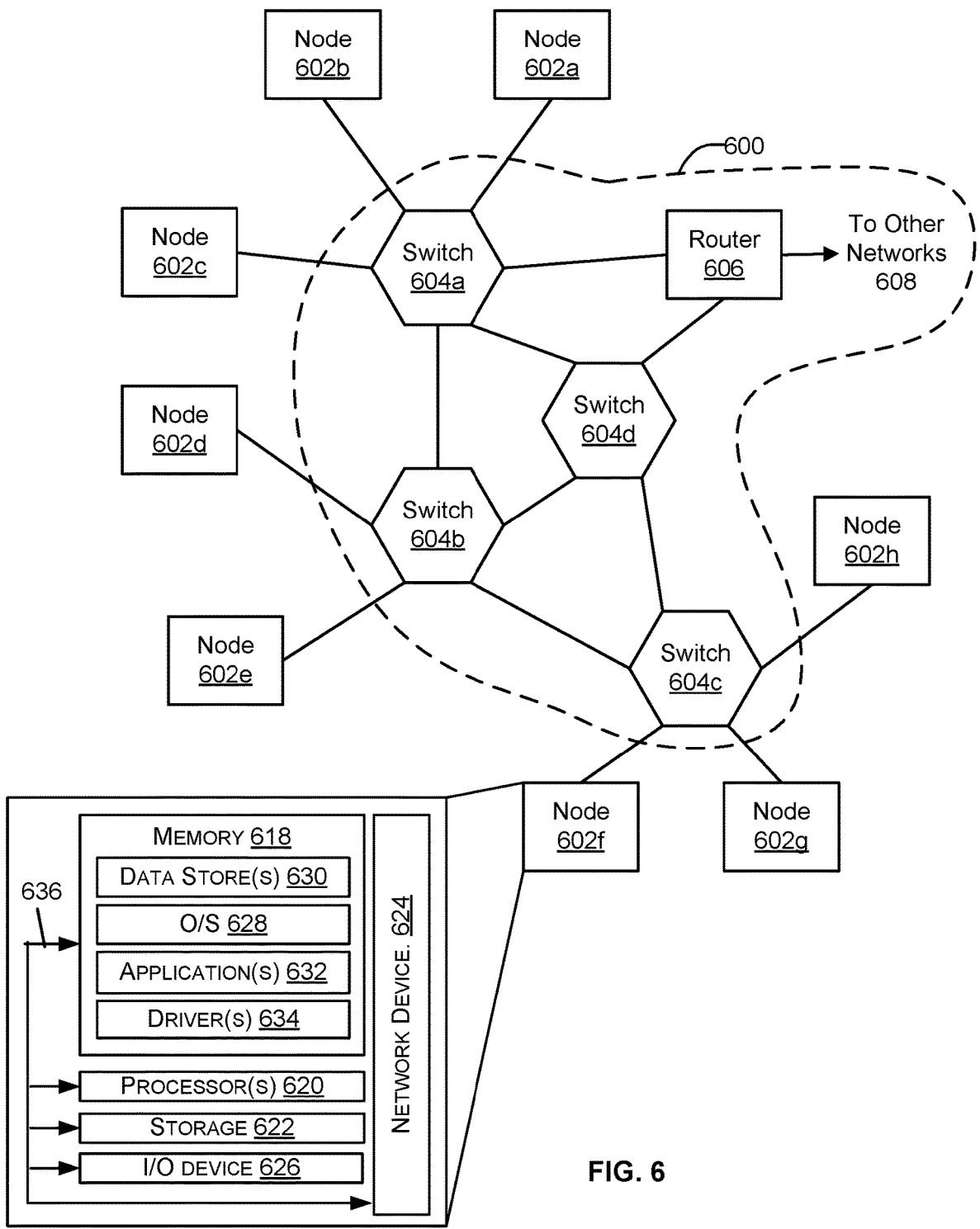
FIG. 6 illustrates an example of a network architecture for features and systems described herein, according to certain aspects of the disclosure.

FIG. 6 illustrates a network 600, illustrating various different types of computing devices 500 of FIG. 5, such as nodes comprising the network device, switches and routers. In certain embodiments, the network 600 may be based on a switched architecture with point-to-point links. As illustrated in FIG. 6, the network 600 includes a plurality of switches 604a-604d, which may be arranged in a network. In some cases, the switches are arranged in a multi-layered network, such as a Clos network. A computing device 500 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 604a-604d may be connected to a plurality of nodes 602a-602h and provide multiple paths between any two nodes.

The network 600 may also include one or more computing devices 500 for connection with other networks 608, such as other subnets, LANs, wide area networks (WANs), or the Internet, and may be referred to as routers 606. Routers use headers and forwarding tables to determine the best path for forwarding the packets, and use protocols such as internet control message protocol (ICMP) to communicate with each other and configure the best route between any two devices.

In some examples, network(s) 600 may include any one or a combination of many different types of networks, such as cable networks, the Internet, wireless networks, cellular networks and other private and/or public networks. Interconnected switches 604a-604d and router 606, if present, may be referred to as a switch fabric, a fabric, a network fabric, or simply a network. In the context of a computer network, terms "fabric" and "network" may be used interchangeably herein.

Nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices 604. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, network device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain network device(s) 624 that allow the node(s) 602a-602h to communicate with a stored database, another computing device or server, user terminals and/or other devices on the network(s) 600. The network device(s) 624 of FIG. 6 may include similar components discussed with reference to the computing device 500 of FIG. 5.

In some implementations, the network device 624 is a peripheral device, such as a PCI-based device. In these implementations, the network device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 508 may implement NVMe, and the network device 624 may be connected to a computing system using a PCIe interface.

A PCI-based device may include one or more functions. A "function" describes operations that may be provided by the network device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
a set of processor cores;
a memory storing Basic Input Output System (BIOS) firmware;
a PCI express (PCIe) subsystem;
a read-only memory (ROM) configured to store preprogrammed instructions for performing reliability, accessibility, and serviceability (RAS) operations;
a RAS state machine operable to execute the instructions stored in the ROM independently of the BIOS firmware; and
a capability register associated with the RAS state machine,
wherein execution of the instructions by the RAS state machine is initiated by an interrupt indicating an error condition received from an operating system (OS) via the PCIe subsystem,
wherein the OS is configured to read the capability register during boot to discover capabilities of the RAS state machine, and
wherein execution of the instructions by the RAS state machine causes the integrated circuit device to:
halt a processor core affected by the error condition in the set of processor cores while allowing processor cores unaffected by the error condition to continue operating;
service the error condition; and
resume operation of the halted processor core after the error condition has been serviced.

2. The integrated circuit device of claim 1, wherein the RAS state machine comprises a processing agent operable to determine which instructions to execute based on a type of the error condition.

3. The integrated circuit device of claim 1, wherein execution of the instructions by the RAS state machine further causes a hypervisor running on the integrated circuit device to be informed of the error condition being serviced.

4. An integrated circuit device, comprising:
a first memory storing Basic Input Output System (BIOS) firmware;
a set of processor cores;
a peripheral bus subsystem;
a second memory storing instructions for performing reliability, accessibility, and serviceability (RAS) operations;
a RAS state machine operable to execute instructions stored in the second memory to perform reliability, accessibility, and serviceability (RAS) operations independently of the BIOS firmware; and
a capability register associated with the RAS state machine,
wherein execution of the instructions by the RAS state machine is initiated by an interrupt indicating an error condition received from an operating system (OS) via the peripheral bus subsystem,
wherein the OS is configured to read the capability register during boot to discover capabilities of the RAS state machine, and
wherein execution of the instructions by the RAS state machine causes the integrated circuit device to:

halt a processor core affected by the error condition in the set of processor cores while allowing processor cores unaffected by the error condition to continue operating;

service the error condition; and resume operation of the halted processor core after the error condition has been serviced.

5. The integrated circuit device of claim 4, wherein a processing agent of the RAS state machine is configured to determine which RAS operations to perform based on which type of error condition triggered the interrupt.

6. The integrated circuit device of claim 4, wherein the interrupt indicates an error condition in the integrated circuit device has occurred.

7. The integrated circuit device of claim 4, wherein the peripheral bus subsystem is a PCI express (PCIe) subsystem, and wherein the RAS state machine communicates with the OS via the PCIe subsystem.

8. The integrated circuit device of claim 4, wherein the RAS state machine is configured to transition to an idle state after the error condition has been serviced.

9. The integrated circuit device of claim 4, wherein the error condition is a memory error.

10. The integrated circuit device of claim 4, wherein upon completion of the RAS operations:

the RAS state machine generates an interrupt to the OS, and the OS causes the processing by the processor core affected by the RAS operations to resume.

11. The integrated circuit device of claim 4, wherein the RAS state machine asserts an external pin of the integrated circuit device to indicate that the RAS state machine is performing a RAS operation.

12. The integrated circuit device of claim 4, wherein the RAS state machine is a hardware state machine implemented in the integrated circuit device.

13. The integrated circuit device of claim 4, wherein the RAS state machine is implemented in a central processing unit (CPU).

14. A method comprising:

receiving, by a RAS state machine, an interrupt indicating an error condition received from an operating system (OS) via a peripheral bus subsystem of a computing system, the interrupt related to a reliability, accessibility, and serviceability (RAS) event, wherein the OS is configured to read a capability register associated with the RAS state machine during boot to discover capabilities of the logic engine RAS state machine;

executing, by the RAS state machine, a set of instructions stored in a first memory independent of a second memory storing Basic Input Output System (BIOS) firmware, the instructions causing the computing system to perform operations including:

halting a processor core affected by the error condition in a set of processor cores while allowing processor cores unaffected by the interrupt to continue operating;

servicing the error condition; and resuming operation of the halted processor core after the error condition has been serviced.

15. The method of claim 14, wherein the peripheral bus subsystem is a PCIe subsystem.

16. The method of claim 14, wherein:

the RAS event is a memory error, and servicing the error condition includes performing memory repair operations.

17. The method of claim 14, wherein:

the first memory is a read only memory (ROM).

18. The method of claim 17, further comprising:

determining which RAS operation to perform based on which type of error condition triggered the interrupt.

19. The method of claim 14, further comprising:

communicating to a service processor that operations related to the RAS event are being performed.

* * * * *